(12) United States Patent
Ha

(10) Patent No.: US 8,368,642 B2
(45) Date of Patent: Feb. 5, 2013

(54) INPUT APPARATUS FOLLOWING TASK FLOW AND IMAGE FORMING APPARATUS USING THE SAME

(75) Inventor: Kwang-soo Ha, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 662 days.

(21) Appl. No.: 12/276,495

(22) Filed: Nov. 24, 2008

(65) Prior Publication Data

US 2009/0153914 A1 Jun. 18, 2009

(30) Foreign Application Priority Data

Dec. 17, 2007 (KR) .................. 10-2007-0132415

(51) Int. Cl.
*G09G 5/00* (2006.01)
(52) U.S. Cl. ......... 345/156; 345/157; 345/168; 345/173
(58) Field of Classification Search .................. 345/157, 345/660, 156, 168, 173; 399/8, 81; 382/289
See application file for complete search history.

(56) References Cited

U.S. PATENT DOCUMENTS

| 4,916,487 A | 4/1990 | Yamada | |
| 6,263,118 B1 * | 7/2001 | Kanno et al. | 382/289 |
| 2001/0028808 A1 * | 10/2001 | Nomura et al. | 399/81 |
| 2005/0100352 A1 * | 5/2005 | Imai | 399/8 |
| 2007/0237538 A1 | 10/2007 | Ishihara et al. | |
| 2008/0252599 A1 * | 10/2008 | Ross et al. | 345/157 |
| 2010/0201712 A1 * | 8/2010 | Grignani et al. | 345/660 |

FOREIGN PATENT DOCUMENTS

| CN | 1442564 | 9/2003 |
| CN | 1553975 | 12/2004 |
| JP | 09131941 | 5/1997 |
| JP | 2000-321936 | 11/2000 |
| JP | 2005257973 | 9/2005 |
| JP | 2007-128381 | 5/2007 |
| WO | 03/023117 | 3/2003 |

OTHER PUBLICATIONS

Chinese Office Action Issued on Mar. 23, 2012 in CN Patent Application No. 200810185605.7.

* cited by examiner

*Primary Examiner* — Thuy Pardo
(74) *Attorney, Agent, or Firm* — Stanzione & Kim, LLP

(57) ABSTRACT

An input apparatus includes a command input unit to input a command, a key input unit having at least one key, a navigation key input unit having a rotatable navigation key, and a display panel unit to perform displaying according to manipulation of the command input unit, the key input unit, and the navigation key. In the input apparatus, the command input unit, the key input unit, the navigation key input unit, and the display panel unit are arranged in sequence according to a task flow, so a user-friendly input apparatus can be implemented.

10 Claims, 7 Drawing Sheets

INPUT APPARATUS FOLLOWING TASK FLOW AND IMAGE FORMING APPARATUS USING THE SAME

CROSS-REFERENCE TO RELATED APPLICATIONS

This application claims priority under 35 U.S.C. §119 (a) from Korean Patent Application No. 10-2007-0132415, filed on Dec. 17, 2007, in the Korean Intellectual Property Office, the disclosure of which is incorporated herein by reference in its entirety.

BACKGROUND OF THE INVENTION

1. Field of the Invention

The present general inventive concept relates to an input apparatus and an image forming apparatus using the same. More particularly, the present general inventive concept relates to an input apparatus in which diverse keys and a display panel are arranged to accommodate a task flow, and an image forming apparatus using the same.

2. Description of the Related Art

As electronic technology has been developing, diverse image forming apparatuses such as printers, scanners, copiers, and facsimile machines have become widespread. Recently, multifunctional apparatuses integrating functions of diverse image forming apparatuses have been widely distributed. The more functions image forming apparatuses have, the more tasks users can perform using the image forming apparatuses.

The user can use the image forming apparatus in the following three situations: when the user writes and prints a document using a computer connected to the image forming apparatus; when the user copies or scans a document by manipulating a control panel of the image forming apparatus; and when a facsimile is externally received and printed.

In these cases, the user must be able to input diverse selection commands using an operation panel mounted on the image forming apparatus so as to utilize the image forming apparatus conveniently. However, since the image forming apparatus has more diverse functions but is miniaturized, utilizing the image forming apparatus efficiently and conveniently using the conventional operation panel is difficult.

Furthermore, the user needs to recognize whether the image forming apparatus is functioning normally and whether the user is manipulating the image forming apparatus normally when the user carries out a desired task using the image forming apparatus.

Accordingly, the conventional image forming apparatus provides the user with feedback of user input using movement of a cursor or texts on the LCD area. However, the LCD area and navigation keys are disperse, so the user can be distracted. That is, in order to check the feedback (reaction) of the image forming apparatus, the user has to monitor the display unit while manipulating the diverse keys.

In addition, if the structure of the operation panel is complicated to implement increasingly diverse functions, manipulating the operation panel by the user is difficulty.

These limitations are not restricted to the image forming apparatus, but are commonly applied to all electronic apparatuses having diverse menus.

SUMMARY OF THE INVENTION

The present general inventive concept provides an input apparatus in which diverse keys and a display panel are arranged appropriately according to a task flow and to provide respective feedback in response to user input so that the user can input selection commands efficiently, and an image forming apparatus using the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an input apparatus including a command input unit to input a command, a key input unit having at least one key, a navigation key input unit having a navigation key to perform at least one of a rotation and a selection of a direction, and a display panel unit to perform displaying according to a manipulation of the command input unit, the key input unit, and the navigation key, wherein the command input unit, the key input unit, the navigation key input unit, and the display panel unit are arranged in sequence.

The display panel unit may include a variable menu button, and a display panel disposed next to the variable menu button to perform displaying, and to display a menu to be located corresponding with the variable menu button.

The display panel unit may further include a mode button disposed at one side of the display panel to set an operation mode of an electronic apparatus to which the input apparatus is applied.

The navigation key input unit may further include a state display unit including a plurality of luminous elements which are arranged along a circumference of the navigation key to provide a user with feedback in response to a user input by providing one or more display patterns corresponding to the manipulation of at least one of the command input unit, the key input unit, and the navigation key.

The state display unit may provide at least one of the display patterns including a display pattern having lighting luminous elements of a number corresponding to a degree of rotating the navigation key, a display pattern having sequentially lighting and flickering of the plurality of luminous elements in one direction, a display pattern having lighting or flickering of the plurality of luminous elements at the same time, a display pattern having repeating lighting and flickering of the plurality of luminous elements at the same time, and a display pattern having changing a color of the luminous elements.

The navigation key input unit may further include a pushable area to be formed on a portion of the navigation key such that if a portion of the pushable area is pressed, the state display unit lights a luminous element corresponding to the pressed portion of the pushable area, and if the navigation key is rotated while a portion of the pushable area is being pressed, luminous elements corresponding to a moving distance of the pressed pushable area.

The command input unit, the key input unit, the navigation key input unit, and the display panel unit may be arranged in sequence according to a task flow.

The state display unit may provide at least one of the display patterns including a display pattern having sequentially lighting and flickering of the plurality of luminous elements, a display pattern having lighting of the plurality of luminous elements at the same time, a display pattern having repeating lighting and flickering of the plurality of luminous elements at the same time, and a display pattern having changing a color of the luminous elements, corresponding to a state of the electronic apparatus to which the input apparatus is applied.

The state of the electronic apparatus includes at least one of power on/off, ready state, power save mode, fax transmission/reception, data transmission/reception, mail transmission/reception, printing state, and error occurring.

The foregoing and/or other aspects and utilities of the present general inventive concept may also be achieved by providing an image forming apparatus including an operation panel unit including a command input unit to input a command, a key input unit having at least one key, a navigation key input unit having a navigation key to perform at least one of a rotation and a selection of a direction, and a display panel unit, wherein the command input unit, the key input unit, the navigation key input unit, and the display panel unit are arranged in sequence, and a control unit to perform displaying corresponding to a manipulation of at least one of the command input unit, the key input unit, and the navigation key input unit.

The display panel unit may include a variable menu button, and a display panel to be formed next to the variable menu button to perform displaying, and to display a menu to be located corresponding with the variable menu button.

The display panel unit may further include a mode button to be formed at one side of the display panel to set an operation mode of an electronic apparatus to which the input apparatus is applied.

The navigation key input unit may further include a state display unit including a plurality of luminous elements which are arranged along a circumference of the navigation key, and to provide a user with feedback in response to a user input by operating according to a display pattern corresponding to the manipulation of at least one of the command input unit, the key input unit, and the navigation key.

The image forming apparatus may further include a storage unit to store information regarding the display patterns, and an engine controller to control an operation of forming images, wherein the control unit detects the information regarding the display pattern corresponding to the manipulation of at least one of the command input unit, the key input unit, and the navigation key, operation state of the engine controller, and state of the image forming apparatus, from the storage unit, and controls the state display unit to perform displaying corresponding to the detected information regarding the display pattern.

The information regarding the display pattern includes information regarding lighting luminous elements of a number corresponding to a degree of rotating the navigation key, sequentially lighting and flickering the plurality of luminous elements in one direction, lighting or flickering the plurality of luminous elements at the same time, repeating lighting and flickering the plurality of luminous elements at the same time, and changing a color of the luminous elements.

The control unit controls the state display unit to display at least one of the display patterns including a display pattern having sequentially lighting and flickering of the plurality of luminous elements, a display pattern having lighting of the plurality of luminous elements at the same time, a display pattern having repeating lighting and flickering of the plurality of luminous elements at the same time, and a display pattern having changing a color of the luminous elements, corresponding to a state of the image forming apparatus.

The state of the image forming apparatus may include at least one of power on/off, ready state, power save mode, fax transmission/reception, data transmission/reception, mail transmission/reception, printing state, and error occurring.

The navigation key input unit may further include a pushable area disposed on a portion of the navigation key such that if a portion of the pushable area is pressed, the state display unit lights a luminous element corresponding to the pressed portion of the pushable area, and if the navigation key is rotated while a portion of the pushable area is being pressed, luminous elements corresponding to a moving distance of the pressed pushable area.

The command input unit, the key input unit, the navigation key input unit, and the display panel unit may be arranged in sequence according to a task flow.

The foregoing and/or other aspects and utilities of the general inventive concept may also be achieved by providing an input apparatus usable with an electronic apparatus, the input apparatus including a display panel unit to perform displaying according to a user input, and a plurality of input units to allow the user to provide input to the electronic device, wherein an arrangement of the display panel unit and the plurality of input units with respect to each other on the input apparatus is in a sequential order corresponding to an order of actions to be performed by the user to perform a predetermined task.

The plurality of input units may include a command input unit to input a command, a key input unit having at least one key, and a navigation key input unit having a navigation key to perform at least one of a rotation and a selection of a direction.

The display panel unit may be disposed on a first end portion, the command input unit may be disposed on a second end portion opposite to the first end portion, the key input unit may be disposed between the display panel unit and the command input unit, and the navigation key input unit may be disposed between the key input unit and the display panel unit.

BRIEF DESCRIPTION OF THE DRAWINGS

These and/or other aspects and utilities of the present general inventive will become apparent and more readily appreciated from the following description of the embodiments, taken in conjunction with the accompanying drawings of which.

DETAILED DESCRIPTION OF THE PREFERRED EMBODIMENTS

Figure 1:
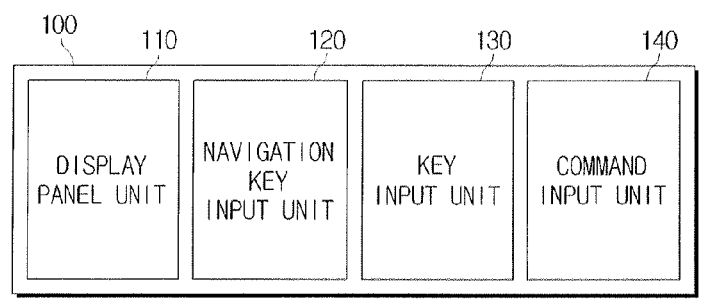
FIG. 1 is a block diagram illustrating a configuration of an input apparatus according to an exemplary embodiment of the present general inventive concept.

Reference will now be made in detail to embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating a configuration of an input apparatus according to an exemplary embodiment of the present general inventive concept. As illustrated in FIG. 1, the input apparatus 100 includes a display panel unit 110, a navigation key input unit 120, a key input unit 130, and a command input unit 140.

The display panel unit 110 displays menus to set diverse functions of an electronic apparatus in which the input apparatus 100 is mounted, results of executing each function, and messages from the input apparatus 100.

The navigation key input unit 120 includes a navigation key to navigate each menu displayed on the display panel unit 110. The navigation key may be implemented as a wheel, a jog shuttle, or a jog dial to rotate, for example, 360°. The user can navigate the menus on the display panel unit 110 by rotating the navigation key.

The key input unit 130 includes at least one key to input diverse selection commands, such as number keys, and text keys.

The command input unit 140 includes command buttons to input diverse commands, such as a start command and a finish command.

As illustrated in FIG. 1, the display panel unit 110 is located leftmost on the input apparatus 100, and the navigation key input unit 120, key input unit 130, and command input unit 140 are disposed in sequence on a right portion of the display panel unit 110. This location is determined considering a task flow of the user. For example, such a sequential arrangement would correspond to a predetermined task to be performed that would require a user to first, view the display panel 110; second, use the navigation key input unit 120; third, use the key input unit 130; and fourth, use the command input unit 140.

In greater detail, the user looks at the menus displayed on the display panel unit 110, and selects a desired menu by manipulating the navigation key on the navigation key input unit 120. The key input unit 130 may also be used to select the menu. If the menu is selected, the user executes the desired task by manipulating the command input unit 140 located rightmost on the input apparatus 100. That is, in order to process the task, the user can execute the desired task from left to right efficiently without confusion.

For example, if an electronic apparatus to which the input apparatus 100 is applied is a facsimile machine or a multifunctional apparatus having a facsimile function, the user identifies a current state of the electronic apparatus on the display panel unit 110, and selects an option for facsimile transmission and reception using the navigation key. Subsequently, the user inputs a fax number of a destination using number keys on the key input unit 130, and then inputs an execution command to transmit the fax using the command input unit 140.

For another example, in the case of a scanner or multifunctional apparatus having a scan-to-email function, the user selects desired options using the display panel unit 110 and navigation key input unit 120, inputs a mail address of a destination using the key input unit 130, and selects an execution command on the command input unit 140. Therefore, the user can operate the input apparatus 100 along the one direction to prevent distracting the user.

Figure 2:
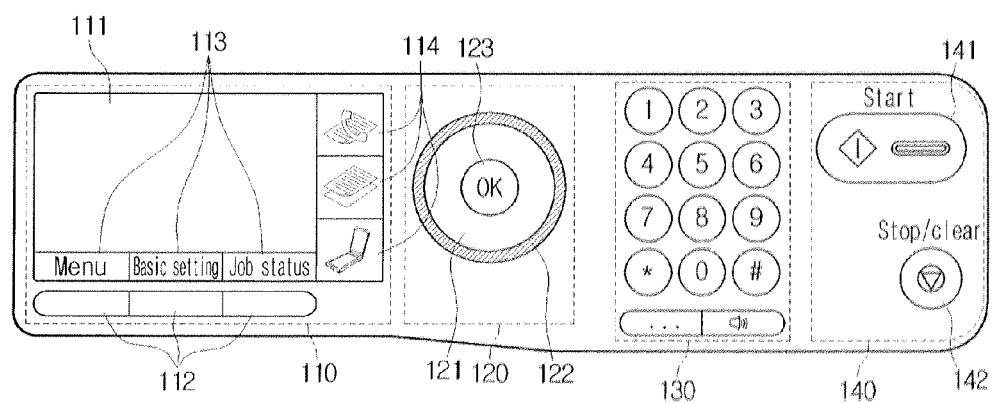
FIG. 2 is a diagram illustrating in detail a configuration of the input apparatus of FIG. 1.

FIG. 2 is a diagram illustrating in detail a configuration of the input apparatus of FIG. 1. As illustrated in FIG. 2, the display panel unit 110 may include a display panel 111, variable menu buttons 112, and mode buttons 114.

The display panel 111 may be implemented as a liquid crystal display (LCD), cathode-ray tube (CRT), plasma display panel (PDP), or organic light emitting diodes (OLED).

The variable menu buttons 112 and mode buttons 114 are located along sides of the display panel 111. The variable menu buttons 112 are buttons which can vary menus to be executed when one of the variable menu buttons 112 is selected according to the settings of the user. That is, the variable menu buttons 112 can be used as multi-purpose buttons. Menus 113 are displayed on one side of the display panel 111 to correspond to the variable menu buttons 112. The menus 113 remain on the display panel 111 although an image displayed on the display panel 111 changes. The menus 113 corresponding to each variable menu buttons 112 include various types, such as "menu," "basic setting," and "job state." The types of the menus 113 can be changed by the user.

The mode buttons 114 are buttons by which the user can change an operation state of the electronic apparatus to which the input apparatus 100 is applied when the electronic apparatus has various operation states, for example, if the electronic apparatus is a multifunctional image forming apparatus including a scanner, facsimile, and printer modes. Accordingly, the mode buttons 114 can be located around the display panel 111 so that the user can notice them with ease. That is, the mode buttons 114 may be located on the right side of the display panel 111 in a row as illustrated in FIG. 2, or located on an upper or lower side horizontally.

In FIG. 2, the variable menu buttons 112 and mode buttons 114 are implemented as hardware buttons, but may also be implemented as touch-screen buttons.

The navigation key input unit 120 includes a navigation key 121 and a state display unit 122. A press button 123 may be formed on the navigation key 121. The navigation key 121 rotates about the press button 123.

The press button 123 can operate as a confirmation key to set a menu selected by the navigation key 121.

The state display unit 122 is formed along a circumference of the navigation key 121, so if the user manipulates the navigation key 121, the key input unit 130, or the command input unit 140, the state display unit 122 provides feedback corresponding to the manipulation.

The state display unit 122 includes a plurality of luminous elements. Various display patterns can be provided by lighting or flickering each of the luminous elements in sequence, or lighting or flickering the luminous elements at the same time. For example, the state display unit 122 may be implemented as a light emitting diode (LED) module including a plurality of LEDs. Hereinafter, the state display unit 122 implemented as an LED module is described as an example.

The state display unit 122 displays the state using a display pattern, such as by lighting LEDs of a number corresponding to a degree of rotating the navigation key 121, by sequentially lighting and flickering the plurality of LEDs in one direction, by lighting and flickering the plurality of LEDs at the same time, by repeating lighting and flickering the plurality of LEDs at the same time, or by changing color of the LEDs.

Moreover, the state display unit 122 may change the display pattern according to the operation state and condition of the electronic apparatus to which the input apparatus 100 is applied. That is, when the electronic apparatus exhibits a particular condition, such as power on/off, ready state, power save mode, fax transmission/reception, data transmission/reception, mail transmission/reception, printing state, and error occurring, the state display unit 122 lights or flickers the LEDs in a different display pattern depending on each of the situations, so that the user can realize the state of the electronic apparatus with ease.

Figure 3:
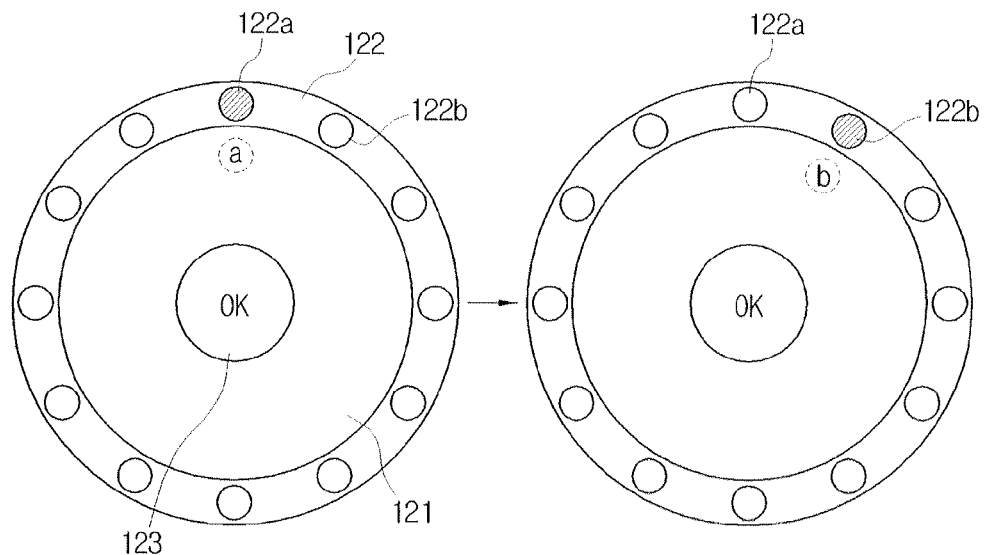
FIG. 3 is a diagram illustrating an example of a process of manipulating a navigation key.

FIG. 3 illustrates one example of a display pattern of the state display unit 122. If the user presses "a" area on the navigation key 121, an LED 122a corresponding to the "a" area is lit. The remaining LEDs stay unlit. In this state, if "a" area of the navigation key 121 is rotated to "b" area, the LED 122a corresponding to the "a" area is flickered and the LED 122a corresponding to the "b" area is lit. In another example, if "a" area of the navigation key 121 is rotated to "b" area, two LEDs corresponding to the "a" and "b" areas may be all lit. The state display unit 122 may further include an opaque sheet to cover the LEDs, so light of the LEDs can be dispersed and seen dimly.

Figure 4A:
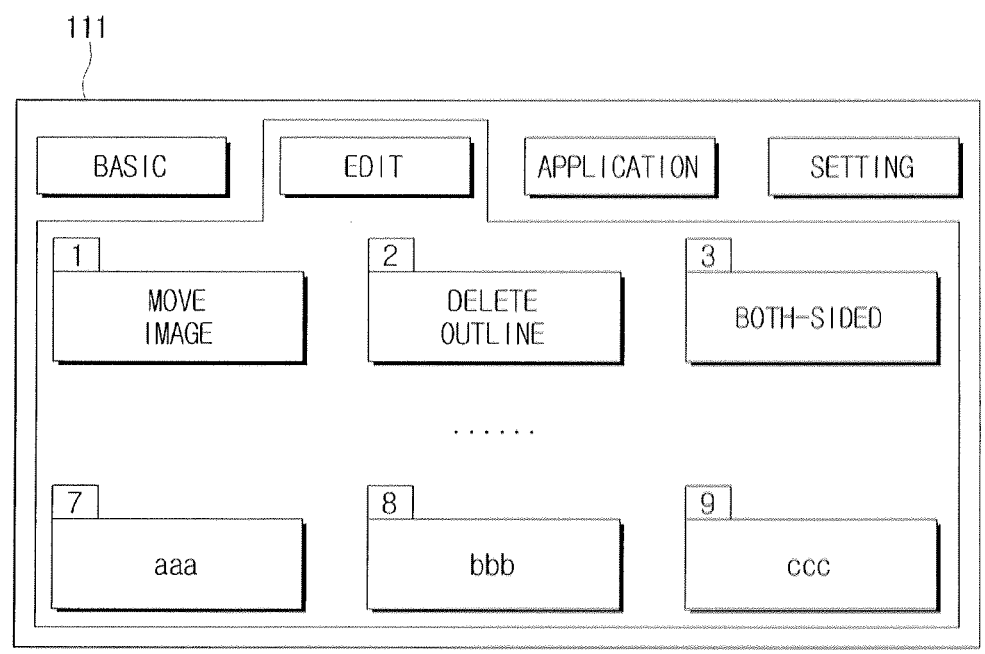
FIGS. 4A and 4B are diagrams illustrating an example of a process of navigating menus according to manipulation of the navigation key.

FIG. 4A illustrates a state of navigating menus on the display panel unit 110 (FIG. 2) according to manipulation of the navigation key 121 (FIG. 3). As illustrated in FIG. 4A, various types of higher menus, such as "basic", "edit", "application", and "setting", are displayed on the display panel 111 of the display panel unit 110, and each higher menu may change according to a mode which is supported by the electronic apparatus to which the input apparatus 100 is applied.

If one of the higher menus is selected, lower menus belonging to the higher menu are displayed under the higher menu. At first, "basic" menu and respective lower menus thereof are displayed, and if the navigation key 121 is rotated by one increment clockwise as illustrated in FIG. 3, "edit" menu which is at the right side of the "basic" menu is selected, and the lower menus of the "edit" menu, such as "move image", "delete outline", "both-sided", . . . , and "ccc", are displayed.

Figure 4B:
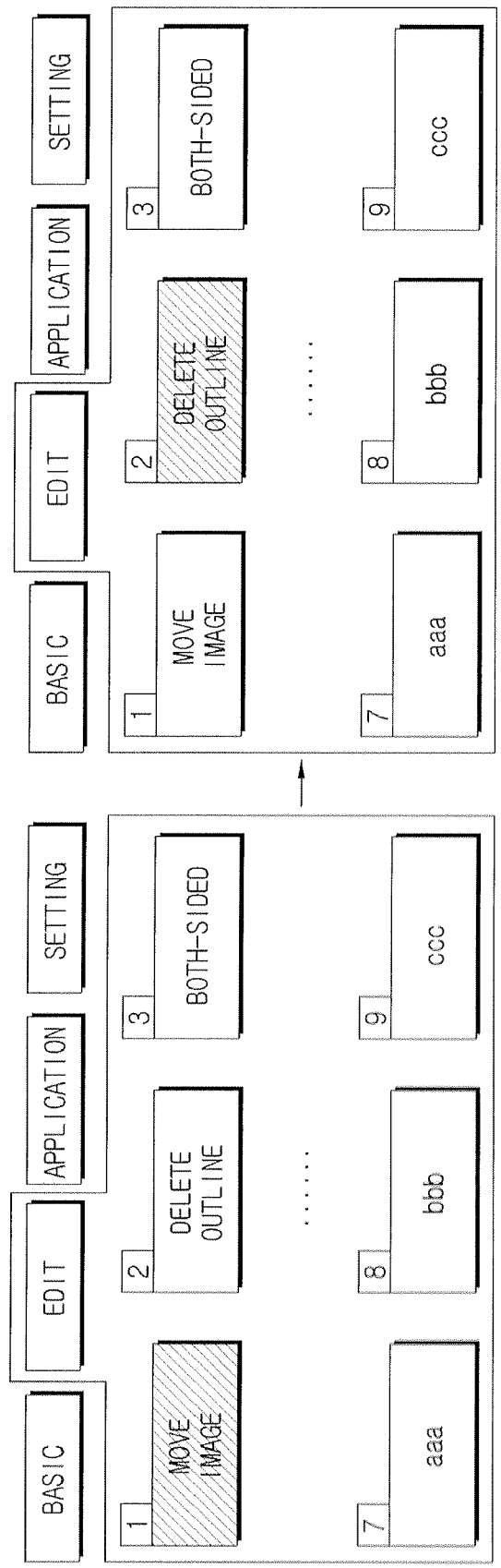

FIG. 4B illustrates a process of navigating lower menus on the display panel unit 110 (FIG. 2) according to manipulation of the navigation key 121 (FIG. 3). Referring to FIGS. 2 and 4B, in the state that the "edit" menu is selected, if the press button 123 is pressed, a cursor is located on the "move image" menu which is the first menu of the lower menus which are subordinate to the "edit" menu, as illustrated in the left drawing of FIG. 4B. The press button 123 may be located on any place of the navigation key 121 other than a center of the navigation key 121 in plurality of numbers. The cursor may be expressed by illustrating color, shade, or flickering of the lower menu icons differently.

In this state, if the navigation key 121 is rotated clockwise again, the cursor moves to the "delete outline" menu as illustrated in the right drawing of FIG. 4B. If the press button 123 is pressed, the "delete outline" menu is selected and applied to the task.

FIGS. 4A and 4B illustrate the menu navigation operation using only the navigation key 121. However, menu selection can also be performed using number keys on the key input unit 130 by allocating a number to each higher menu and lower menu. That is, since the key input unit 130 of FIG. 2 includes a plurality of number keys and other selection keys, the user can personally input a fax number of a destination, email of a destination, or a short text message.

Referring to FIG. 2, the command input unit 140 which is located rightmost on the input apparatus 100 includes a start command key 141, and a stop/clear key 142. If menu selection and function settings are completed using the navigation key 121 and the key input unit 130, the user can input a command to execute a task using the command input unit 140.

That is, the user firstly identifies selectable menus on the display panel unit 110 which is located leftmost on the input apparatus 100, navigates the menus using the navigation key input unit 120 and the key input unit 130 which are located right of the display panel unit 110, and executes the task using the command input unit 140 which is located rightmost on the input apparatus 100. Therefore, since a focus of the user can move along the one direction on the input apparatus 100, distracting the user can be prevented.

FIGS. 5A to 5D are diagrams illustrating various display patterns of the state display unit 122 (FIG. 2) of the navigation key input unit 120 (FIG. 2). For convenience of description, the description focuses on the LEDs except for the opaque sheet on the state display unit 122.

Figure 5A:
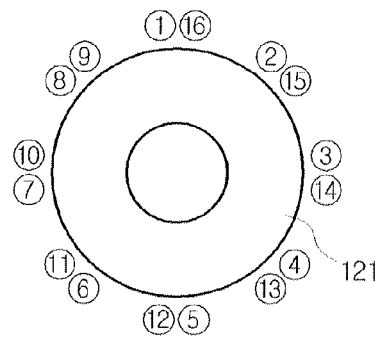
FIG. 5A is a diagram illustrating an example of a configuration of a state display unit.

Referring to FIGS. 2 and 5A, the state display unit 122 are implemented as a plurality of LEDs in pairs. That is, the state display unit 122 includes the LEDs of 8 pairs (for example, #1 and #16 are in pairs), and two LEDs constituting one pair may have different colors. Display patterns of two or more colors can be provided by combining the LEDs of 8 pairs having different colors (for example, #1 and #16). For example, if the LEDs of 8 pairs consists of red LEDs (#1 to #8) and blue LEDs (#9 to #16), red LEDs and blue LEDs are used separately or are used together to display a display pattern of pink color.

The color of the plurality of LEDs (#1 to #16) can be used to display a state of the electronic apparatus to which the input apparatus 100 is applied. For example, if the input apparatus 100 is applied to an image forming apparatus, the blue LEDs are used when the image forming apparatus is in a normal state. When the image forming apparatus is in error states, such as in a toner empty state, paper jam state, and cover open state, the red LEDs are used. In addition, when the image forming apparatus is in a warning state, such as in a toner low state and paper mismatching state, the blue LEDs and red LEDs are used together to display pink light.

Figure 5B:
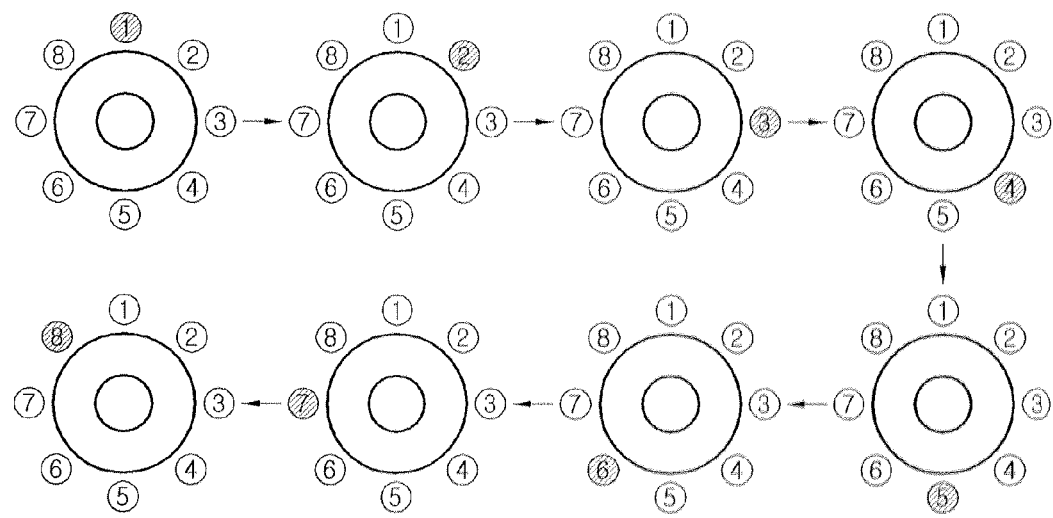
FIGS. 5B to 5D are diagrams illustrating diverse display patterns.

In addition, as illustrated in FIG. 5B, the state display unit 122 (FIG. 2) can sequentially light and flicker the LEDs ($1^{st} \rightarrow 2^{nd} \rightarrow \ldots 8^{th}$ LED order) when the electronic apparatus to which the input apparatus 100 is applied is performing a job or searching for a menu or a file.

Figure 5C:
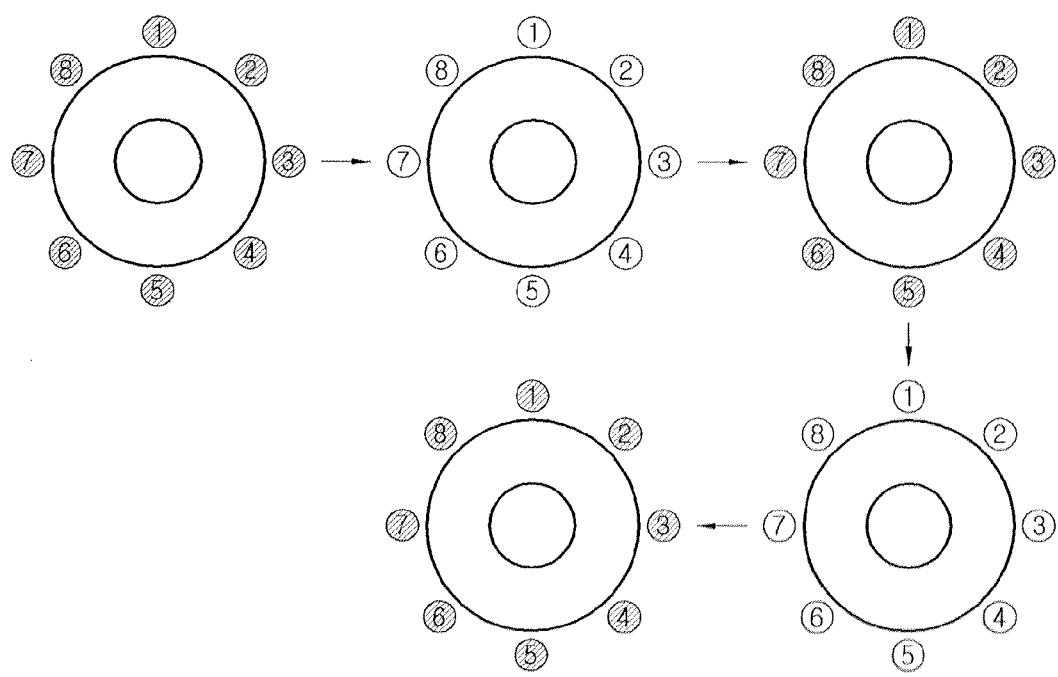
Figure 5D:
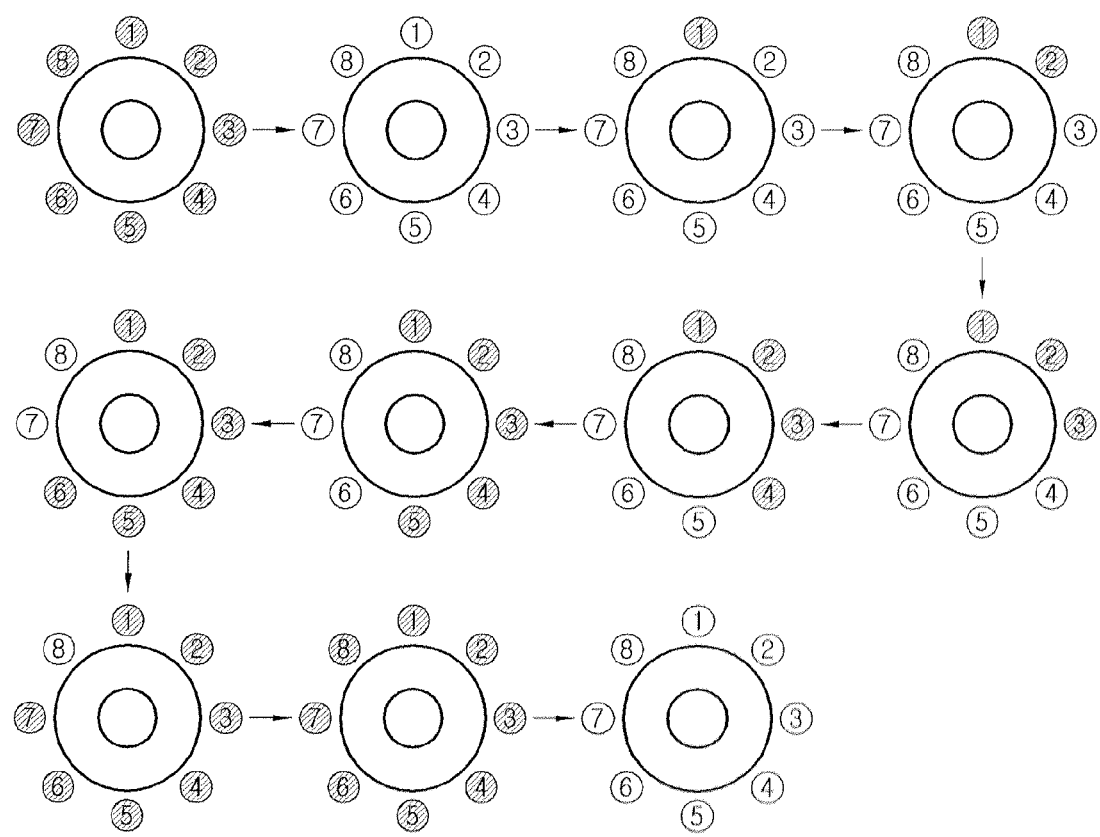

In addition, the state display unit 122 can repeatedly light and flicker the LEDs at the same time as illustrated in FIG. 5C, and the state display unit 122 can sequentially light the LEDs and flicker all lit LEDs at the same time as illustrated in FIG. 5D.

Such various display patterns are set to correspond to an action of the user or the operation state of the electronic apparatus, and can easily provide feedback of results of the action or the state of the electronic apparatus to the user.

As illustrated in FIGS. 1 and 2, the display panel unit 110, navigation key input unit 120, key input unit 130, and command input unit 140 are located considering a right-handed user, and may also be located in inverse order in order to correspond to left-handed users. Furthermore, the display panel unit 110, navigation key input unit 120, key input unit 130, and command input unit 140 are located horizontally in FIGS. 1 and 2, but may also be located vertically. That is, the display panel unit 110 may be located uppermost, and the command input unit 140 may be located lowermost, so the focus of the user flows from an up to down direction from viewing the display panel unit 110 to viewing the command input unit 140.

Figure 6:
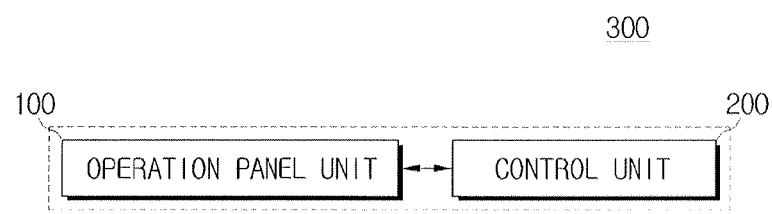
FIG. 6 is a block diagram illustrating a configuration of an image forming apparatus according to an exemplary embodiment of the present general inventive concept.

FIG. 6 is a block diagram illustrating a configuration of the image forming apparatus 300 to which the input apparatus is applied. The image forming apparatus 300 includes an operation panel unit 100 and a control unit 200. The operation panel unit 100 can be implemented with the input apparatus 100 as illustrated FIG. 1 or FIG. 2, so for convenience of description, the reference numeral of the operation panel unit is shared with the reference numeral "100" of the input apparatus.

The user can select desired menus and input commands using the operation panel unit 100.

If the user manipulates at least one of the command input unit 140, the key input unit 130, and the navigation key input unit 120 on the operation panel unit 100, the control unit 200 change and displays menus on the display panel unit 110. If a desired menu is finally selected, a task of applying a function of the selected menu is performed. That is, copying, scanning, printing, or fax transmission and reception can be performed.

Figure 7:
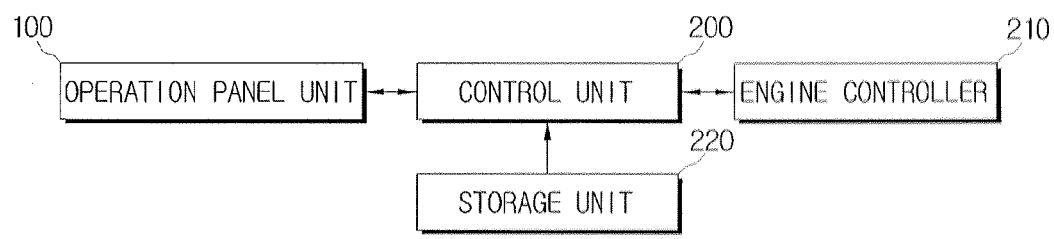
FIG. 7 is a block diagram illustrating in detail a configuration of the image forming apparatus of FIG. 6.

FIG. 7 is a block diagram illustrating in detail the configuration of the image forming apparatus 300 of FIG. 6. The image forming apparatus 300 further includes an engine controller 210, and a storage unit 220 in addition to the operation panel unit 100 and a control unit 200.

The engine controller 210 controls an operation of an engine which substantially forms images, and operates a developing unit, a charge unit, a laser scanning unit (LSU), a photoconductive unit, a transfer unit, and a fusing unit according to bitmap images input by the control unit 200. This is the case when the image forming apparatus 300 is a laser image forming apparatus, and the present general inventive concept can also be applied when the image forming apparatus 300 is an inkjet laser image forming apparatus.

The engine controller 210 notifies an operation state thereof (for example, a state of forming an image, a stand-by state, or an error occurring state) to the control unit 200. Therefore, the control unit 200 operates the state display unit 122 to illustrate appropriate display patterns according to the operation state of the engine controller 210 and the state of the image forming apparatus 300. The state of the image forming apparatus 300 includes power on/off, ready state, power save mode, fax transmission/reception, data transmission/reception, mail transmission/reception, printing state, error occurring, and other states.

Information regarding display patterns is detected from the storage unit 220. The storage unit 220 stores information regarding display patterns according to diverse operation states, such as by lighting LEDs of the number corresponding to the degree of rotating the navigation key 121, by sequentially lighting and flickering the plurality of LEDs in one direction, by lighting and flickering the plurality of LEDs at the same time, by repeating lighting and flickering the plurality of LEDs at the same time, or by changing color of the LEDs.

As described above, the control unit 200 provides the user with appropriate feedback according to the user input or the operation state of the image forming apparatus 300, so the user can recognize the current operation state of the image forming apparatus 300.

As can be appreciated from the above description, an input apparatus which can be applied to diverse electronic apparatuses including an image forming apparatus according to various embodiments of the present general inventive concept includes a display panel, diverse buttons, and a rotatable navigation key which are arranged according to a task flow. Therefore, such a user-friendly input apparatus allows the user to input selection commands more efficiently and conveniently.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having a printing mode, a copying mode and a scanning mode, the image forming apparatus comprising:
a command input portion having a command key to receive a command input;
a numeric input portion having a numeric key to receive a numeric input;
a navigation input portion having a rotational unit and a pressing unit to receive a rotational input and a pressing input, respectively; and
a display portion to display one or more menu items in response to one of the rotational input and the pressing input, the one or more menu items associated with a function mode selected among the printing mode, the copying mode and the scanning mode and each being designed to select an operation to be executed under the selected function mode;
one or more mode buttons provided adjacent to the display portion in order to select the copying mode or the scanning mode, the one or more mode buttons including a copy function button operable to cause a copy user interface screen to be displayed in the display portion, the copy user interface screen showing a menu item relating to the copying mode, and a scan function button operable to cause a scan user interface screen to be displayed in the display portion, the scan user interface screen showing a menu item relating to the scanning mode,
wherein the command input portion, the numeric input portion, the navigation input portion, and the display portion are arranged in sequence such that the navigation input portion is located between the numeric input portion and the display portion and such that the numeric input portion is located between the command input portion and the navigation input portion located in a front region of the image forming apparatus.

2. The image forming apparatus of claim 1, further comprising:
one or more menu buttons located adjacent to the display portion,
wherein in a first function mode, a menu button corresponds to a first menu item displayed in the display portion and associated with a first operation to be executed under the first function mode, and in a second mode, the menu button corresponds to a second menu item displayed in the display portion and associated with a second operation to be executed under the second function mode.

3. The image forming apparatus of claim 1, wherein the navigation input portion further comprises:
a state display unit including one or more luminous elements which are arranged along a circumference of the rotational unit to provide a user with feedback in response to a user input by providing one or more patterns on the state display unit, each pattern corresponding to a manipulation of at least one of the command input portion, the numeric input portion, and the navigation input portion.

4. The image forming apparatus of claim 3, wherein the one or more patterns including a first pattern being formed by lighting at least one of the one or more luminous elements collectively showing a level corresponding to a degree of rotation of the rotational unit, a second pattern being formed by sequentially lighting and flickering at least one of the one and more luminous elements in one direction, a third pattern being formed by lighting or flickering at least one of the one or more luminous elements at the same time, a fourth pattern being formed by repeating lighting and flickering of at least one of the one or more luminous elements at the same time, and a fifth pattern being formed by changing a color of at least one of the one or more luminous elements.

5. The image forming apparatus of claim 4, wherein the state of the image forming apparatus comprises at least one of power on/off, ready state, power save mode, fax transmission/ reception, data transmission/reception, mail transmission/reception, printing state, and error occurring.

6. The image forming apparatus of claim 3, wherein the navigation input portion further comprises:

a pushable area to be formed on a portion of the navigation input portion such that when a portion of the pushable area is pressed, the state display unit lights a luminous element corresponding to the pressed portion of the pushable area, and when the navigation input portion is rotated while a portion of the pushable area is being pressed, luminous elements corresponding to a moving distance of the pressed pushable area.

7. The image forming apparatus of claim 3, wherein the state display unit provides at least one of the display patterns including a display pattern having sequentially lighting and flickering of the plurality of luminous elements, a display pattern having lighting of the plurality of luminous elements at the same time, a display pattern having repeating lighting and flickering of the plurality of luminous elements at the same time, and a display pattern having changing a color of the luminous elements, corresponding to a state of the image forming apparatus.

8. The image forming apparatus of claim 1, wherein the command input portion, the numeric input portion, the navigation input portion, and the display portion are arranged in sequence according to an order of a predetermined task.

9. The image forming apparatus of claim 1, wherein the display portion displays a status of the image forming apparatus.

10. The image forming apparatus of claim 9, wherein the state of the image forming apparatus includes at least one of power on/off, ready state, power save mode, fax transmission/reception, data transmission/reception, mail transmission/reception, printing state, and error occurring.

* * * * *